L. K. WATROUS.
NUT LOCK.
APPLICATION FILED MAR. 21, 1910.

980,034.

Patented Dec. 27, 1910.

WITNESSES:
Geo. N. Naylor
Walton Harrison.

INVENTOR
Lawrence Kearney Watrous
BY Munn & Co
ATTORNEYS

UNITED STATES PATENT OFFICE.

LAWRENCE KEARNEY WATROUS, OF SEA CLIFF, NEW YORK.

NUT-LOCK.

980,034.  Specification of Letters Patent.  Patented Dec. 27, 1910.

Application filed March 21, 1910. Serial No. 550,658.

*To all whom it may concern:*

Be it known that I, LAWRENCE KEARNEY WATROUS, a citizen of the United States, and a resident of Sea Cliff, in the county of Nassau and State of New York, have invented a new and Improved Nut-Lock, of which the following is a full, clear, and exact description.

My invention relates to nut locks, my special purpose being to provide a construction wherein a nut is mounted upon a sleeve, and the sleeve in turn is mounted upon a bolt, and so arranged that in consequence of pressure of the nut upon the sleeve none of the parts can readily move relatively to other parts.

Reference is to be had to the accompanying drawings forming a part of this specification, in which similar characters of reference indicate corresponding parts in all the figures.

Figure 1:
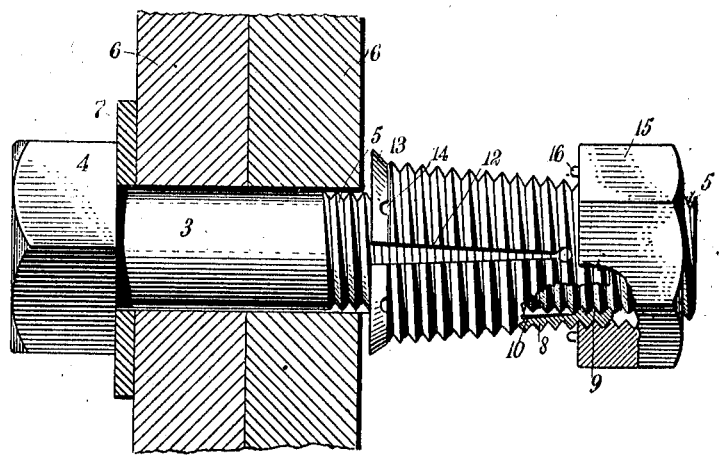
Figure 2:
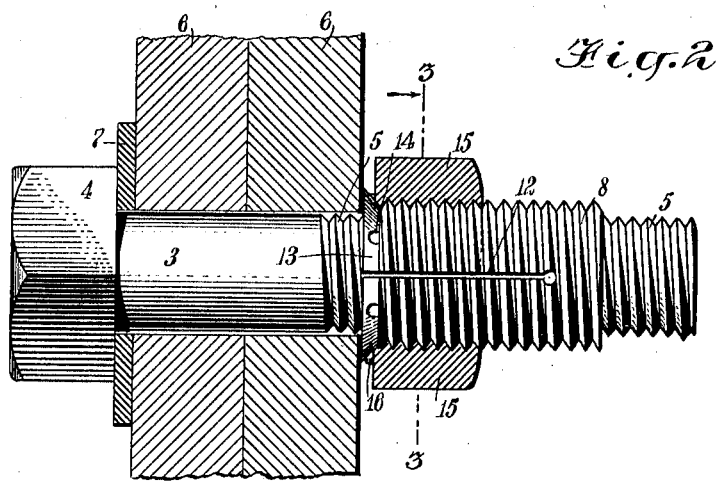
Figure 3:
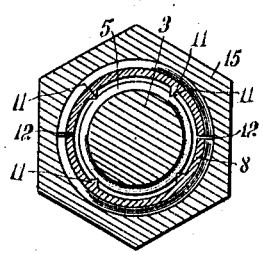

Figure 1 is a view partly in section and partly in elevation, showing my improved nut lock, the parts in this instance appearing as they do before the nut is tightened; Fig. 2 is a view similar to Fig. 1, but differs therefrom in showing the nut and sleeve as tightened; and Fig. 3 is a section on the line 3—3 of Fig. 2, looking in the direction of the arrow, and showing means for preventing the sleeve from turning relatively to the bolt.

A bolt 3 is provided with a head 4 integral with it and is further provided with a thread 5.

At 6 is shown the work to which the bolt is to be applied—say two plates to be clamped together.

At 7 is a washer encircling the bolt and engaged by the head thereof.

A sleeve 8 is provided inwardly adjacent to one of its ends with a thread 9 and is further provided with a smooth inner surface 10 which extends from the thread 9 to the opposite end of the sleeve. The sleeve 8 is provided internally with ribs 11 each having a sharp inner edge so as to cut across the threads 5 of the bolt. At 12 are slots in the sleeve 8, these slots extending from the inner thread 9 to the opposite end of the sleeve.
The sleeve 8 is further provided with an annular flange 13 which serves the purpose of a shoe. This flange is provided with notches 14.

At 15 is a revoluble nut which is threaded internally and free to turn upon the sleeve 8. This nut is provided with lugs 16 which are adapted to fit into the notches 14.

The operation of my device is as follows: The bolt being thrust through the plates 6 so that the head 4 comes into engagement with the washer 7, the sleeve 8 is slipped over the opposite end of the bolt, so that the inner thread 9 engages the thread 5. The nut 15 is next brought into engagement with the sleeve 8 and is turned. The rotation of the nut causes the sleeve 8 to turn until the flange 13 is brought against the adjacent plate 6. The rotation of the sleeve 8, sufficient to bring the flange 13 into engagement with the plate 6, is a comparatively easy matter owing to the fact that, as shown in Fig. 1, the two divergent portions of the sleeve 8 upon opposite sides of the slot 12 fit very loosely upon the bolt 5. When, however, by turning the nut 15, the flange 13 lodges squarely against the plate 6, the rotation of the sleeve 8 ceases and the nut 15 begins to travel relatively to the sleeve. By fitting the nut 15 a little more tightly upon the sleeve 8 than this sleeve fits upon the bolt 5, it is an easy matter to cause the rotation of the sleeve 8 by turning the nut 15. The flange 13 serves as a foot and prevents, or at least greatly limits, the rotation of the sleeve 8. The nut 15 being turned still further, the slot 12 is contracted as indicated in Fig. 2, so that the nut passes to the left according to the figures, until it lodges against the flange 13. In doing this, the ribs 11 are forced across and into the threads 5 so that backward rotation of the sleeve 8 is thus effectively prevented. The ribs 11 slightly cut the threads 5, but the mutilation is trivial and does not materially deface the bolt. When the nut 15 is brought into engagement with the flange 13, a little further rotation of the nut brings one of the lugs 16 into some one of the notches 14. The flange has now no power to yield, except to spring slightly inward—that is, toward the axis of the bolt 3 as a center, and when the lug 16 lodges in one of the notches 14 the sleeve 8 is perfectly rigid in relation to the bolt and the nut 15 equally rigid relatively to the sleeve. With the parts thus fixed in position, neither the nut nor the sleeve can work loose under ordinary conditions.

Having thus described my invention, I claim as new and desire to secure by Letters Patent:

1. The combination of a bolt, a sleeve encircling the same and provided with a flange having notches, and a nut encircling said sleeve and provided with lugs for entering said notches to prevent said nut from turning.

2. In a nut lock, the combination of a bolt provided with a thread; a sleeve encircling said bolt, said sleeve being provided adjacent to one of its ends with a thread disposed internally of said sleeve and mating said thread of said bolt, said sleeve being further provided with ribs disposed substantially parallel with the longitudinal axis of said sleeve; and a nut fitted upon said sleeve for forcing the ribs thereof toward said bolt.

3. In a nut lock, the combination of bolt; a sleeve encircling the same, said sleeve being fitted adjacent to one of its ends upon said bolt and having ribs; and a nut for forcing said ribs toward said bolt in order to cause said ribs to bite cross-wise into the threads of said bolt.

4. In a nut lock, the combination of a threaded bolt; a sleeve encircling said bolt and provided with a threaded portion engaging the same, said sleeve having a split portion provided internally with ribs and normally springing away from said bolt; and a nut relatively mounted upon said sleeve for forcing said spring portion toward said bolt in order for said ribs to engage the latter.

5. In a nut lock, the combination of a split sleeve provided internally with ribs for biting into a bolt in order to lock said sleeve rigidly in relation with said bolt; and a nut relatively mounted upon said sleeve for drawing together the portions thereof provided with said ribs.

6. A nut lock comprising a split sleeve provided internally with members for engaging a bolt in order to grip said sleeve rigidly in relation with said bolt; said sleeve being threaded externally; and a threaded nut fitted upon said sleeve for the purpose of contracting the same in order for said members to move toward the axis of said sleeve.

7. In a nut lock, the combination of a sleeve provided with a surface to be jammed against a stationary object, said sleeve being provided internally with portions for gripping tightly upon a bolt, said portions relatively movable toward each other and provided with members for gripping tightly against the bolt, said sleeve being threaded externally; and a threaded nut fitted upon said sleeve for forcing said portions thereof toward each other.

In testimony whereof I have signed my name to this specification in the presence of two subscribing witnesses.

LAWRENCE KEARNEY WATROUS.

Witnesses:
THOMAS W. CLACHER,
JOHN MULLER.